Aug. 27, 1968  E. N. ESMAY ET AL  3,398,637
AUTOMATIC FOCUS CONTROL FOR LIGHT PROJECTOR
Filed Feb. 1, 1966  2 Sheets-Sheet 1
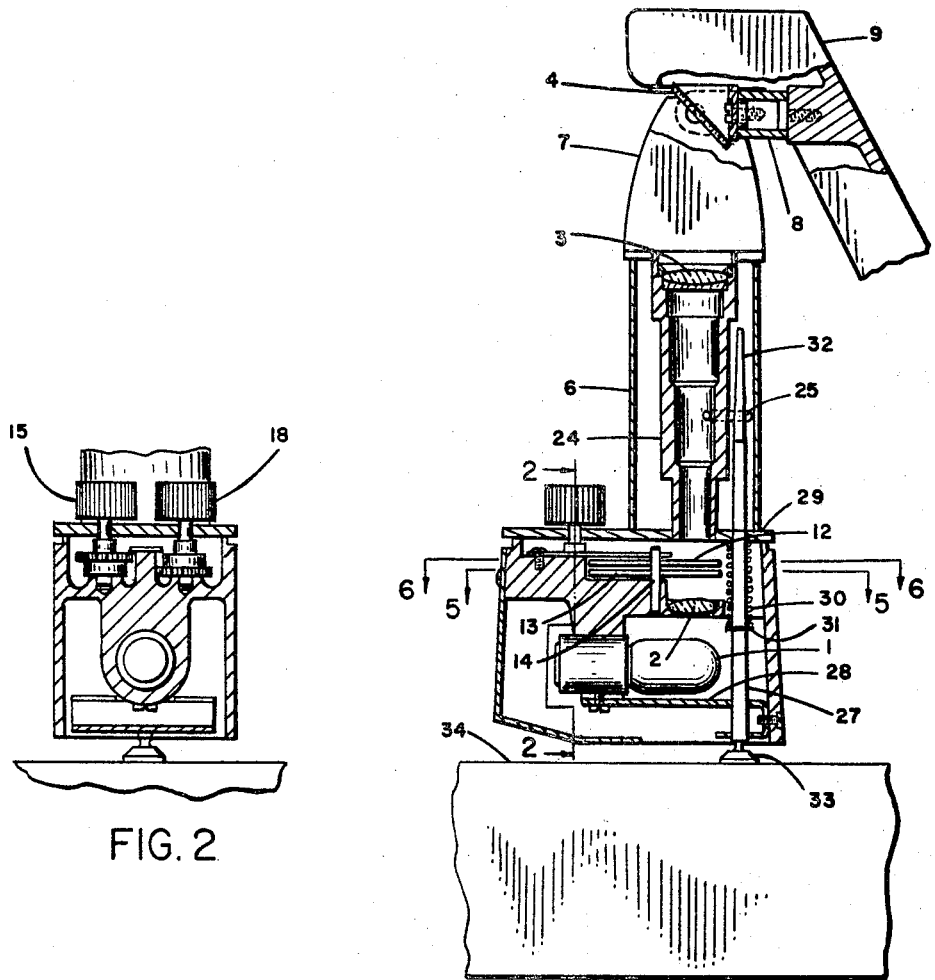
FIG. 2
FIG. 1
FIG. 3
EDWARD N. ESMAY
EARL V. JACKSON
DONN E. STEVENS
INVENTORS
BY 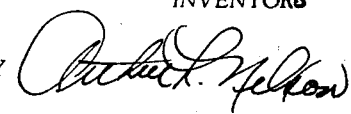
ATTORNEY

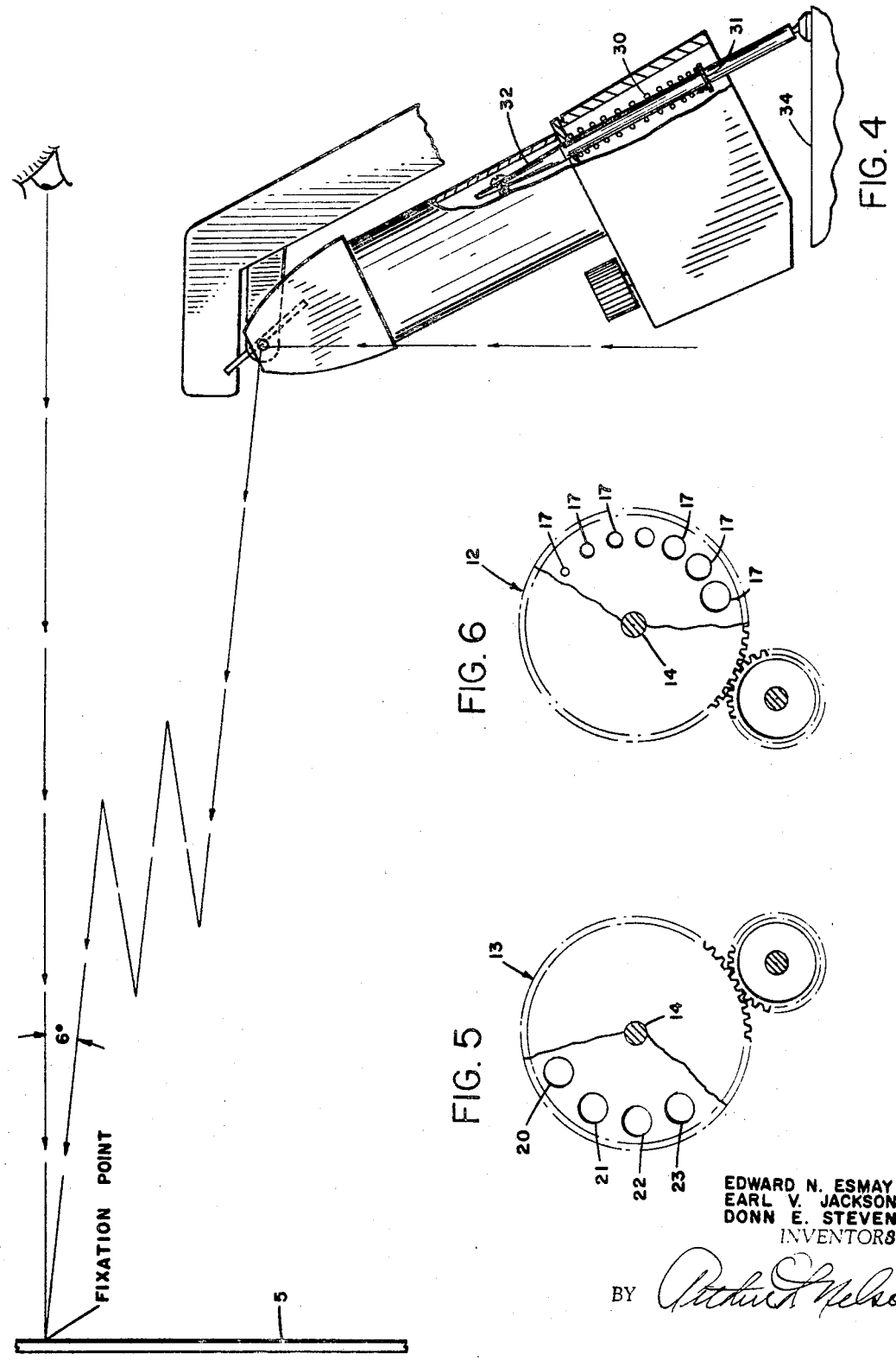

United States Patent Office 3,398,637
Patented Aug. 27, 1968

3,398,637
AUTOMATIC FOCUS CONTROL FOR
LIGHT PROJECTOR
Edward N. Esmay, Brighton, Earl V. Jackson, Penfield, and Donn E. Stevens, Greece, N.Y., assignors to Bausch & Lomb Incorporated, Rochester, N.Y., a corporation of New York
Filed Feb. 1, 1966, Ser. No. 524,227
4 Claims. (Cl. 88—24)

ABSTRACT OF THE DISCLOSURE

A visual testing device for administering a tangent field eye test, the device being characterized by a vertical fixation screen whereon a fixation light stimulus is projected for the patient. The light stimulus is provided by a beam projector which is universally mounted so as to throw the beam onto different locations on the tangent screen, the size and color of the spot of light formed by the beam on the screen being variable. Structurally the device includes a light source which is controlled by a rheostat and is focused by a lens system at a variable focal length which is proportional to the changes in the projection distance from the light source to the locations on the screen.

This invention relates to a light projector and more particularly to an automatic control for focusing the beam of light projected from the projector.

A visual testing device such as illustrated in the copending application Ser. No. 523,717, filed Jan. 28, 1966, of the same assignee, discloses a projector for projecting a beam of light to form a spot on a screen. The projector controls the movement of the light spot across the screen as the patient fixes his eye on a point of fixation on the screen while the eye is tested. Sensitivity to light and to color may vary with each patient and accordingly it is desirable to have a control on the size of the spot of light projected on the screen and also a means for focusing the spot on the screen and controlling the color of the spot.

It is an object of this invention to provide an automatic focus of a beam of light projected from a visual testing device onto a screen.

It is another object of this invention to provide a color control and aperture size control of a beam of light projected on a screen from a visual tester.

It is a further object of this invention to provide a control of size, color, and focus of a beam of light projected from a projector to form a spot on a screen.

The objects of this invention are accomplished by the use of an optical system having illuminating means for projecting a beam of light. The beam of light is projected onto a screen and the projector has means for moving the spot over a flat screen. The distance from the point of projection on the projector to various portions on the screen changes as the spot moves across the screen. Accordingly it is desirable to vary the focal plane of the beam of light as it is projected onto the screen. This is done by means of a rod having a cam surface controlling the movement of a lens, and a lens mount which has a portion extending through a cam slot in the housing for the optical system. The rod rotates the lens mount and moves the lens mount and lens axially to maintain the focal plane substantially coincidental with the screen in direct relationship to the extension and retraction of the rod which extends to the planar surface of the base immediately below the projector. In combination with the automatic focusing device a manual means is provided to interchange aperture size and filters for controlling the spot size on the screen and the color of the beam of light projected on the screen.

The preferred embodiments of this invention are illustrated in the attached drawings.

FIGURE 1 illustrates a cross section view of the projector and the automatic focusing means.

FIGURE 2 is a cross section view showing the control for the filter and aperture.

FIGURE 3 is an external view of the housing for the lens system and the helical slot.

FIGURE 4 is a schematic view illustrating the geometrical relationship of the projector and screen.

FIGURE 5 is a cross section view illustrating the filter.

FIGURE 6 is a cross section view illustrating the aperture disk.

Referring to the drawings FIGURE 1 illustrates an optical system having a lamp 1 projecting light into the optical system. The lenses 2 and 3 project light against the mirror 4 which reflects a beam of light onto a screen 5. The housing 6 is suspended by the yoke 7 pivotally supported on the fork 8. The fork 8 is rotatably mounted on the frame 9 which is supported on a suitable base 10. The yoke 7 rotates on an axis normal to the axis of rotation of the fork 8. An aperture disk 12 and filter disk 13 rotate about the axis of the pin 14 in response to rotation of the knurled knob 15. The knurled knob 15 rotates the aperture disk 12 which has a plurality of apertures 17 of increasing size. Each aperture 17 is selectively rotated into the light beam in the optical system and allows a predetermined amount of light to pass through the aperture and through the optical system.

The knurled knob 18 rotates the filter disk 13 which defines four openings 20, 21, 22 and 23. Opening 20 does not contain any filter and merely allows the light beam to pass through the optical system unobstructed. The opening 21 contains a blue filter, opening 22 contains a green filter, and opening 23 contains a red filter. Each opening may be rotated into the light beam by the knob 18 selectively to provide the desired color of the beam of light which is projected through the system.

The lens 2 is fixed within the housing relative to the lamp 1. The lens 3 may be slidably positioned at a variable distance from the lens 2. The sleeve 24 supports the lens 3 and also carries a cam follower 25 which extends through a helical slot 26.

The focusing rod 27 extends through the optical system housing 6 and plates 28 and 29 and moves axially relative to the plates. A spring 30 is seated against the collar 31 and engages the plate 29 to bias the rod 27 to an extended position. The upper end of the rod is formed with a tapered portion 32 which engages the lateral surface of the cam follower 25 to rotate the sleeve 24 in response to the movement of the rod 27. The rod 27 also carries a foot 33 which has a flat surface for engaging the planar surface 34 of the base 10 of the projector. As the optical system housing 6 is pivoted on its two supporting axes the focusing rod 27 is retracted or extended relative to the housing 6. The axial movement of the rod 27 rotates the sleeve 24 to axially move the lens 3 and produce a focusing of the system. It can be seen that as the light spot is projected upwardly or downwardly on the screen from a point of reflection on the mirror 4 to the screen that the distance between the point of reflection on the mirror to the point of incidence on the screen will vary. With an increase of distance from the point of reflection on the mirror to the screen a corresponding extension of the focusing rod 27 will also be produced. This in turn rotates the sleeve 24 to retract the lens 3 relative to the lens 2 in the optical system. This provides an automatic focusing of the image of the light on the screen.

Referring to FIGURE 4 this relationship is more clearly illustrated. As the housing for the optical system swings from a vertical position of its axis to any other position inclined to a vertical position the focusing rod extends from the housing a greater distance. This in turn produces a changing of the diagram of the forces acting on the focusing rod 27 and the mass of the housing and optical system.

When the projector is in a vertical position and the force of gravity is operating through the pivot point there are no forces acting on the projector which would tend to move it from this position except the slight offset position of the focusing rod forcing the foot against the base surface which is overcome by the friction between the foot and the base surface to retain the stationary condition of the projector.

When the projector housing is tilted to the side as indicated in FIGURE 4 the downward force of gravity acting through the center of gravity of the projector tends to reposition the projector in a vertical position. Counter forces act on the projector through the pivot pin and the contact portion of the foot against the base surface. These forces produce a counter balancing effect on the projector mass. The force acting on the foot may be resolved into a reaction force opposing the force of the spring 30 tending to compress the spring and also a moment force tending to rotate the foot against a moment force in the opposite direction created by the force of gravity. The forces on the pivot pin include the vertical force acting through the pin supporting the housing and a reacting force opposing the force of the spring.

The combined forces create a counter balancing effect which tend to prevent movement of the projector from its static position. With a greater inclination of the base surface relative to the spring force applied through the rod to the foot which engages the base surface, then a greater rotational torque is applied to the housing. Accordingly the rotational moment of gravity increases with a greater deviation of the projector from a vertical position which is counteracted by the greater relative inclination of the base surface acting on the foot which produces a greater torque. The counterbalancing effect tends to produce a static condition of the projector in any position. The spring force however, decreases as the focusing rod extends from the projector and this decrease in force eventually decreases the moment force on the inclined base surface relative to the force from the foot and beyond certain limits this counter-rotating force is not sufficient to overcome the increasing gravitational moment. The mechanism however, operates over a sufficiently wide range to allow the foot to maintain its static position once the movement of the projector is stopped.

An aiding force in maintaining the static position of the projector is the static friction created between the foot and the base surface. The combination of forces produce the counterbalancing effect tending to maintain the static condition of the projector within the limits of movement necessary for the projector.

The operation of the projector as a visual testing instrument has been described in the above mentioned copending application of the same assignee. The operation of the focusing device in the subject invention which operates in conjunction with the visual testing instrument is described as follows.

The source of light 1 projects a beam of light through the lens system which is reflected by the mirror 4 to the screen 5. As the projector is pivoted about its pivotal support the spot will rise and fall on the surface of the screen in accordance with the relationship of the optical components. It is apparent that the distance of the point of reflection on the mirror to the varying point of incidence on the screen is a variable. The optical system focuses the beam of light on the screen and thereby produces a well defined spot of uniform size on the screen. As the distance from the reflecting point on the mirror to the varying point of incidence on the screen changes the focal plane distance is also changed automatically by the focusing mechanism.

The focusing mechanism comprises the focusing rod 27 which is slidably supported in the housing of the lens system and is biased to a downward position by the spring 30. As the distance from the opening in the projector receiving the rod to the base surface 34 varies the rod 27 extends accordingly to continually engage the base surface 34. The extending and withdrawing movement of the focusing rod 27 will accommodate the changing distance from the projector and the base surface 34 automatically causes the tapered surface 32 to rotate the cam follower 25 in a helical slot 26. This in turn produces a sliding movement of the sleeve 24 carrying the lens 3 which extends the focal plane in accordance with an extension of the focusing rod 27. Gravity returns the sleeve downward when the rod extends, however, any suitable means such as a spring might be used to bias the sleeve against the tapered portion of the rod 27. The movement of the rod produces a spot on the screen which is in focus on the screen despite the variation in the distance from the reflection point on the mirror 4 and the position of the spot on the screen.

It is noted that FIGURE 4 shows the fixation point on the screen horizontally in line with the eye fixed on the fixation point. The fixation point is also approximately 6° above the point of reflection on the mirror of the projector which projects the beam of light on the screen. Accordingly the portion of the screen horizontally in line with the mirror is a shorter distance than points above and below this horizontal portion. To provide accurate focusing the push rod 27 is slightly behind the optical center of the projector and accordingly is contracted slightly as the spot moves from the fixation point to a horizontal position in front of the projector and this will accordingly shorten the focal distance and maintain the focal plane coincidental with the screen.

A lateral movement of the spot on the screen will produce an extension of the rod 27 and accordingly increase the distance of the focal plane to maintain the focal plane coincidental with the focal plane. Therefore for any position of the optical axis a corresponding extending or retraction will automatically control the focal plane of the projector and maintain this focal plane substantially coincidental with the plane of the screen.

An added feature of the projector is the use of the variable size aperture which may be positioned in the optical system to control the aperture size of the light beam passing through the lens system. The aperture disk 12 is formed with a plurality of apertures 17 which may selectively position in the optical system by means of rotation of the knurled knob 15 which carries a pinion gear to rotate the aperture disk.

A further feature of the projector is a filter disk 13 which carries a plurality of filters in openings and an opening without a filter which may be each selectively positioned in the optical system by means of rotation of the knurled knob 18. The knurled knob 18 carries a pinion similar to that of the aperture knob which in turn rotates the filter disk 13 to place the proper colored filter in the lens system and accordingly projects the desired color of spot on the screen.

The preferred embodiments of this invention may be devised which fall within the scope of this invention which are defined by the attached claims.

We claim:

1. An automatic focusing device for a light projector comprising
   a lens system having at least one axially slidable element on a lens mount to vary the distance of the focal plane from the projector,
   a light source directing a light beam through the lens system to define a spot for projection onto a screen,
   a housing pivotally supporting said lens system to cause movement of the light beam on the screen, a base surface positioned beneath the projector, a spring biased focusing rod slidably mounted in said housing, one end of said rod extending to and engaging said base surface, the other end of said rod engaging said lens mount, a cam surface formed on the other end of said focusing rod engaging a cam follower carried by said sleeve causing said sleeve to rotate and produce an axial movement of the lens for focusing the lens system by moving said slidable lens and varying the focal distance in accordance with the distance intermediate between the projector and the screen.

2. An automatic focusing device for a projector projecting a light beam comprising, a lens system having at least one movable lens mounted in a sleeve to vary the distance of the focal plane of the projector, a screen, a light directing a beam of light through the lens system, a housing means defining a cam slot receiving a portion of said sleeve and for housing said lens system, means pivotally supporting said lens system and housing for providing movement of a light beam on said screen, a surface positioned intermediately below said projector, a spring biased focusing rod having one end extending from the housing and engaging said surface and producing a counter moment of force to overcome the gravitational moment of force and resist movement of the projector from a static condition, a cam surface on the other end of said focusing rod engaging a cam follower carried by said sleeve causing said sleeve to rotate and produce an axial movement of the lens for focusing the spot on said screen and simultaneously produce a continuous focusing condition of the spot on the screen.

3. An automatic focusing device as defined in claim 2 wherein an aperture disk is positioned in the optical system for selectively controlling the aperture size of the light beam projected through the lens system and for controlling the spot size on the screen.

4. An automatic focusing devise for a light projector as set forth in claim 2 wherein a plurality of filters may be selectively positioned in the optical system to control the color of the spot projected on the screen.

References Cited

UNITED STATES PATENTS

| | | | |
|---|---|---|---|
| 1,626,841 | 5/1927 | Kelley et al. | 88—24 |
| 2,431,669 | 11/1947 | Nemeth | 88—24 |
| 2,809,553 | 10/1957 | Van Den Broeck | 88—24 |

NORTON ANSHER, *Primary Examiner.*

R. M. SHEER, *Assistant Examiner.*